US012240743B2

(12) United States Patent
Buscema

(10) Patent No.: US 12,240,743 B2
(45) Date of Patent: Mar. 4, 2025

(54) CARGO LOADER

(71) Applicant: SAFE Structure Designs, LLC, Las Vegas, NV (US)

(72) Inventor: John Buscema, New Port Richey, FL (US)

(73) Assignee: SAFE Structure Designs, LLC, Las Vegas, NV (US)

( * ) Notice: Subject to any disclaimer, the term of this patent is extended or adjusted under 35 U.S.C. 154(b) by 0 days.

(21) Appl. No.: 18/776,213

(22) Filed: Jul. 17, 2024

(65) Prior Publication Data

US 2024/0391744 A1 Nov. 28, 2024

Related U.S. Application Data

(63) Continuation of application No. PCT/US2024/021182, filed on Mar. 22, 2024.

(60) Provisional application No. 63/454,041, filed on Mar. 22, 2023.

(51) Int. Cl.
*B66F 9/12* (2006.01)
*B66F 9/06* (2006.01)

(52) U.S. Cl.
CPC ................ *B66F 9/12* (2013.01); *B66F 9/063* (2013.01)

(58) Field of Classification Search
CPC ........................................................ B64F 1/322
USPC .......................................................... 414/495
See application file for complete search history.

(56) References Cited

U.S. PATENT DOCUMENTS 3,623,617 A 11/1971 Nemessanyl
4,491,449 A * 1/1985 Hawkins ............... B66F 7/0625 182/69.5
5,794,416 A 8/1998 Rahman
5,829,948 A * 11/1998 Becklund .............. B66F 7/0625 254/8 R
6,571,913 B2 * 6/2003 Puszkiewicz ........... B66F 9/165 182/69.5
7,641,043 B2 1/2010 Vestergaard
(Continued)

FOREIGN PATENT DOCUMENTS

CN 107416738 A 12/2017
CN 210620174 U 5/2020
(Continued)

OTHER PUBLICATIONS

Pocket Lift Plus, Accessed Mar. 18, 2023; URL: <https://www.mdbsrl.com/eng/product/pocket-lift-plus/12/#home>.
John Deere 544E forklift, Mar. 1, 2005; URL: <https://picryl.com/media/a-civilian-operates-a-john-deere-544e-forklift-equipment-to-load-a-pallet-of-a7b93c>.

*Primary Examiner* — Mark C Hageman

(74) *Attorney, Agent, or Firm* — Lippes Mathias LLP; Mitchell Ghaneie; Josephine Chen

(57) ABSTRACT

The present disclosure provides a cargo loader comprising a tractor assembly and a vertical adjustment assembly carried by the tractor assembly. The vertical adjustment assembly comprises a base, a deck platform linked to the base by a lifting mechanism. The lifting mechanism is configured to retract and extend in a vertical direction such that a height of the deck platform varies between a retracted height and an extended height. The vertical assembly further comprises an attachment. The attachment is interchangeably and removably coupled to the deck platform and configured to vary between the predetermined retracted height and the predetermined extended height.

20 Claims, 16 Drawing Sheets

(56) References Cited

U.S. PATENT DOCUMENTS

| | | | | |
|---|---|---|---|---|
| 8,425,174 | B2 | 4/2013 | Quirion | |
| 9,790,069 | B2 | 10/2017 | Davis et al. | |
| 9,815,672 | B2 | 11/2017 | Baudermann | |
| 10,399,834 | B2 | 9/2019 | Artoni et al. | |
| 10,919,748 | B2 * | 2/2021 | Calomino | B66F 9/12 |
| 2005/0042068 | A1 * | 2/2005 | Ehmen | B66F 9/10 414/661 |
| 2009/0257854 | A1 | 10/2009 | Wright et al. | |

FOREIGN PATENT DOCUMENTS

| | | | |
|---|---|---|---|
| EP | 0276851 | A2 | 8/1988 |
| EP | 2321181 | B1 | 12/2018 |
| FR | 2031709 | A5 | 11/1970 |
| FR | 2567083 | A1 | 1/1986 |
| GB | 2423760 | A | 9/2006 |

* cited by examiner

CARGO LOADER

CROSS-REFERENCE TO RELATED APPLICATIONS

This application is a continuation application of International Application (PCT) No. PCT/US24/21182, which claims the benefit of U.S. Provisional Application No. 63/454,041, filed Mar. 22, 2023, and is hereby incorporated by reference in its entirety for all purposes.

FIELD OF THE INVENTION

The subject matter disclosed herein generally relates to a cargo loader and more specifically to a multi-use cargo loader that comprises a vertical adjustment assembly with a lifting mechanism and removable attachments.

PRIOR ART

With the development of globalization and economic growth, the activity level and volume in the transportation industry have grown tremendously. Cargo loaders have always served as an essential tool for freight movement in the transportation industry and are frequently used to load or unload cargo, materials, supplies, commodities, merchandise goods, pallets, or equipment from one facility to another. They are widely used in a variety of industries, including aviation, maritime shipping, railroads, trucking, as well as logistics.

Conventionally, cargo loaders may include forks, risers, articulated arms, or other lifting mechanisms to aid lifting of objects and repositioning. However, heavy weighted or bulky objects may require a certain amount of personnel which may be difficult, laborious, and time-consuming.

There have been attempted solutions for reducing input force when positioning objects on the cargo loader platforms, such as adding rollers or cylinders to reduce fraction between the object and the cargo loader platform. Nevertheless, rollers and cylinders may cause the object to accidentally glide or fall when the cargo loader is in motion which may be unpredictably precarious.

Furthermore, cargo loaders are often limited to single functions, and with the forks, risers, or articulated arms protruding, cargo loaders occupy much space when storing.

Therefore, there is a need for a cargo loader to facilitate loading, repositioning, and unloading of objects, particularly in a manner that is safe, convenient, and efficient and in addition with interchangeable attachments that provides multi-functions and can be compactly stored.

SUMMARY OF THE INVENTION

The following is a concise summary of the invention presented herein with the primary aim of providing a preliminary understanding of certain aspects of the invention. It should be noted, however, that this summary is not intended to serve as a comprehensive overview of the invention, nor does it seek to identify or describe any critical or significant elements of the invention or the boundaries of its scope. Its sole purpose is to provide a rudimentary understanding of the invention's concepts and features, which will be expounded upon in greater detail in the ensuing sections.

The present disclosure is generally directed towards a cargo loader that facilitates loading, repositioning, and unloading of objects. An exemplary, nonlimiting embodiment of the present disclosure, herein after as the "exemplary embodiment", provides a cargo loader generally comprising a tractor assembly and a vertical adjustment assembly.

The cargo loader may further comprise a ramp assembly, a plurality of attachments, a winch assembly and a fairlead set, or a combination thereof. A mounting bracket may be further disposed on a front end of the deck platform, and the aforementioned attachments may be interchangeably and removably attached to the mounting bracket, including a fork riser assembly and a variety of fork extensions for lifting, and a ramp set for self-loading.

The tractor assembly comprises continuous tracks and an engine compartment that mechanically couples to and provides mechanical energy to the continuous tracks. Preferably, the cargo loader further comprises a hydraulic system driven by the engine compartment to provide greater force for heavy loads. The lifting mechanism, the fork riser assembly, and the winch assembly may also be powered by and connected to the hydraulic system. It is anticipated an alternative mechanical mechanism may be used to provide mechanical energy to the cargo loader without departing from the spirit of the invention.

The vertical adjustment assembly is carried by the tractor assembly and further comprises a base and a deck platform disposed above the base and linked to the base by a lifting mechanism to adjust the deck platform to a desired height. The vertical adjustment assembly is configured to retract and extend in a vertical direction, such that a height of the deck platform varies between a predetermined retracted height and a predetermined extended height. A plurality of rollers is disposed on the deck platform, enabling a palletized cargo on the deck platform to be moved effortlessly. Preferably, the lifting mechanism comprises a scissor lift, which is further comprised of at least two scissor link sets, each of which has two arms pivotally coupled at a central brace. However, an alternative lifting mechanism such as a telescopic lift may be used to adjust the deck platform to a desired height without departing from the spirit of the invention.

In some implements, the deck platform further comprises a plurality of rings, preferably positioned on sides of the deck platform.

In one aspect, a plurality of stanchions vertically extend from the base, and a height of each of the stanchions is greater than the retracted height and less than the extended height of the deck platform. The stanchions are arranged in an arrangement that evenly distributes the weight of an object to be lifted. Preferably, equal number of the stanchions are symmetrically disposed on two sides of the base. The deck platform may further comprise a head frame along a periphery. The headframe further comprises two or more receptacles configured to receive and provide passage for the stanchions.

Consequently, when the deck platform extends to a height greater than or equal to the stanchions, a pallet facilitated by the rollers can be easily loaded or off-loaded. On the contrary, when the deck platform retracts to a height less than the stanchions, the stanchions lift the pallet away from the rollers, thereby preventing the pallet to glide or slip off the deck platform when the cargo loader is in motion.

Further, advantageously, the vertical adjustment assembly may also be utilized with the plurality of attachments. Taking the fork extensions as an example, with the fork extensions mounted to the deck platform, the fork extensions bear the load and may extend or retract in unison with the deck platform to a desired height.

The above features and advantages will become apparent from the following detailed description taken with the accompanying drawings.

NUMBERING REFERENCE

10—Cargo Loader
100—Tractor Assembly
110—Engine Compartment
120—Lower Plate
122—Hinge Leaf
124—Glide Rail
130—Continuous Tracks
200—Vertical Adjustment Assembly
210—Head Frame
212—Head Side Member
214—Head Front Member
216—Head Rear Member
219—Rings
220—Deck Platform
222—Roller
230—Base
232—Base Frame
234—Base Plate
236—Stanchions
240—Lifting Mechanism/Scissor Link Sets
242—Exterior Arm
242*a*—Upper End
242*b*—Lower End
244—Interior Arm
244*a*—Upper End
242*b*—Lower End
246—Central Brace
250—First Hydraulic Cylinder
260—Mounting Bracket
262—Top Bar
264—Bottom Bar
265—Locking Groove
266—Top Extension
268—Ramp Connecting Rods
269—Hitch Receiver
270—Tail Stock Set
272—Pallet Stop
274—Winch assembly
276—Fairlead Set
280—First Fork Extension
300—Tilting Assembly
310—Top Plate
312—Supporting Member
314—Crossbar
316—Flange Bearing
318—Top Cylinder Mount
320—Bottom Plate
322—Second Hydraulic Cylinder
324—Bottom Cylinder Mount
330—Side Plate
332—Wheels
334—Rear Plate
340—Hinge Tab
400—Ramp Assembly
410—Ramp Rack
420—Ramp Set
430—Support
500—Fork Riser Assembly
510—Vertical Frame
510*a*—Outer Side Surface
510*b*—Inner Side Surface
512—First Rollers
514—Upper Connector
516—Lower Connector
520—Guide Track
520*a*—Outer Side Surface
520*b*—Inner Side Surface
522—Guide Plate
524—Second Rollers
526—Front Brace
530—Fork Set
532—Second Fork Extension
600—Platform
610—Palletized Cargo
710—Third Fork Extension

DETAILED DESCRIPTION OF THE INVENTION

The following detailed description and accompanying drawings provide a comprehensive disclosure of an exemplary embodiment for the purpose of facilitating one of ordinary skill in the relevant art to make and use the invention. As such, the detailed description and illustration of the one or more exemplary embodiments presented herein are purely exemplary in nature and are not intended to limit the scope of the invention or its protection in any matter. It is further noted that the drawings may not be to scale, and in some cases, certain details may be omitted which are not necessary for an understanding of the present invention, such as conventional details of fabrication and assembly.

Furthermore, there is no intention to be bound by any expressed or implied theory presented in the preceding technical field, background, brief summary or the following detailed description.

Figure 1:
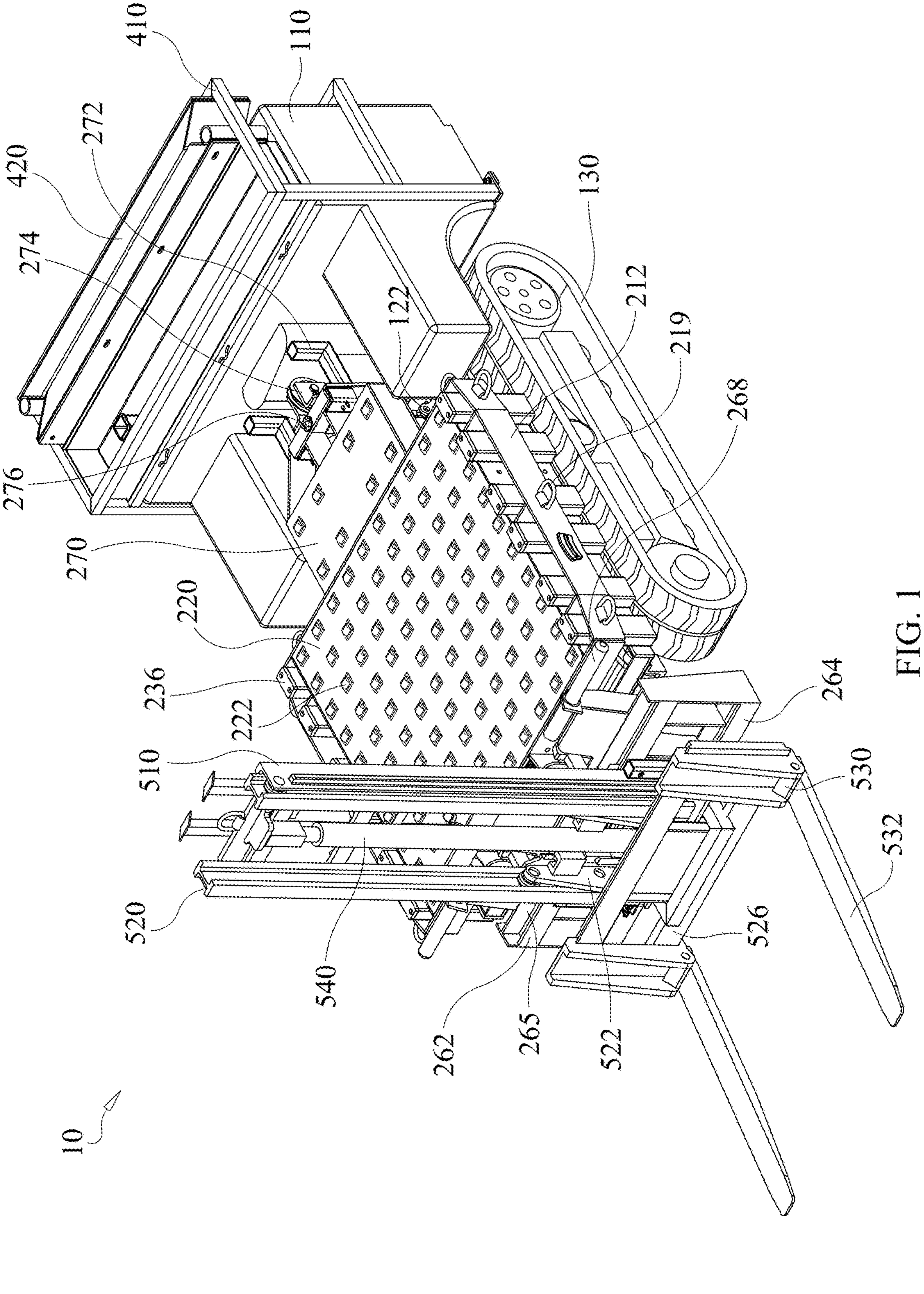
FIG. 1 is a front perspective view of a non-limiting exemplary embodiment (the "exemplary embodiment") of a cargo loader with a fork riser.

For purposes of description herein, the terms “upper”, “lower”, “left”, “rear”, “right”, “front”, “vertical”, “top”, “bottom”, “side” and derivatives thereof shall relate to the device as oriented in FIG. 1. Furthermore, there is no intention to be bound by any expressed or implied theory presented in the preceding technical field, background, brief summary or the following detailed description.

A non-limiting, exemplary embodiment (herein after as the “exemplary embodiment”) of a cargo loader 10 is disclosed herein. The exemplary embodiment of the cargo loader 10 may be interchangeably and removably coupled to a variety of attachments and serves multiple purposes. The cargo loader 10 facilitates secured transportation of objects, preferably, palletized cargo 610, on unimproved grounds or challenging environmental surfaces, including but not limited to mud, water, snow, terrains, and tarmac surfaces. Moreover, the cargo loader 10 supports effortless uploading and unloading of the transported objects to aircrafts or vehicles and provide self-loading options to a user.

Figure 2:
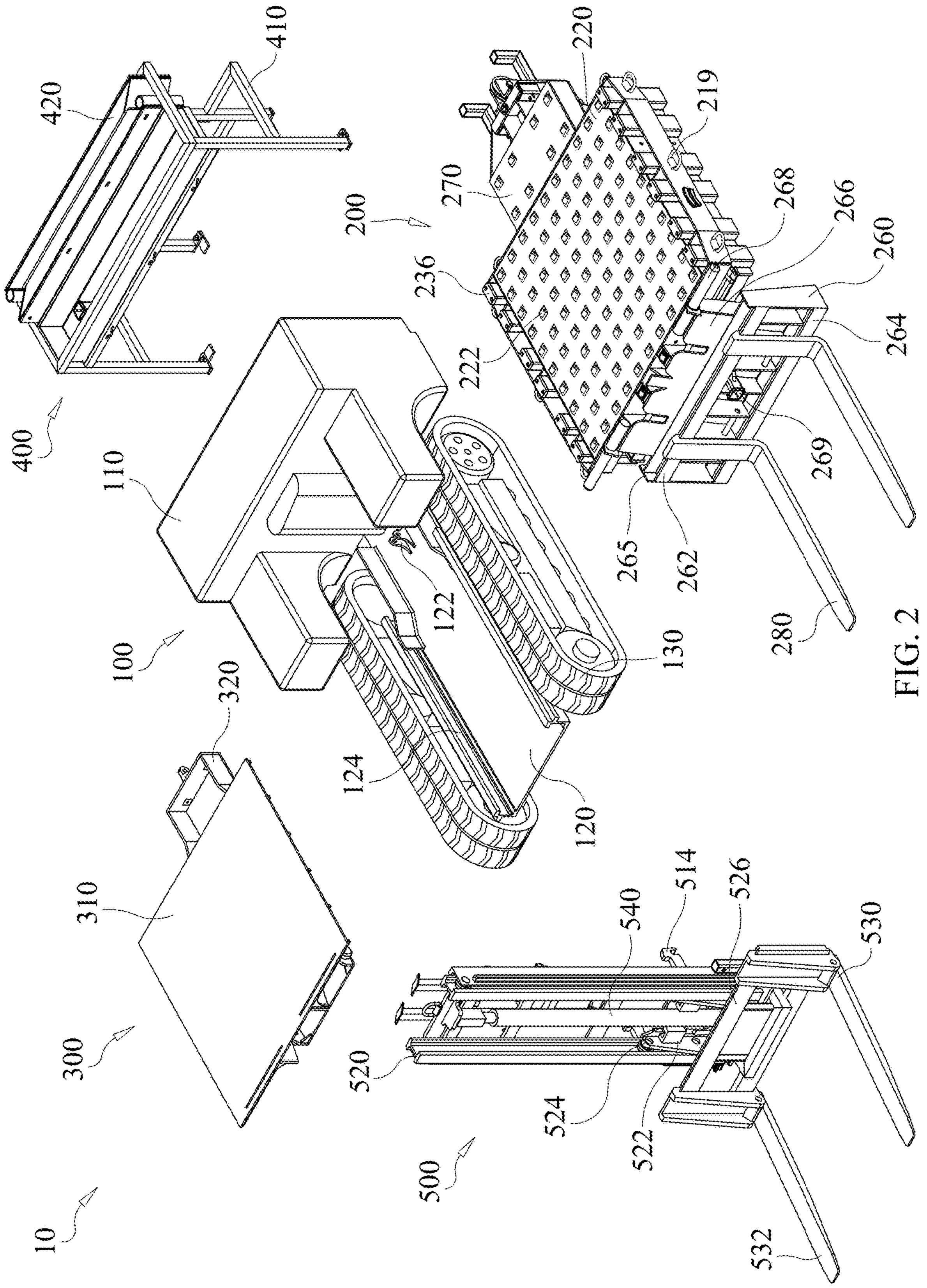
FIG. 2 is an exploded view of the exemplary embodiment of the cargo loader.
Figure 3:
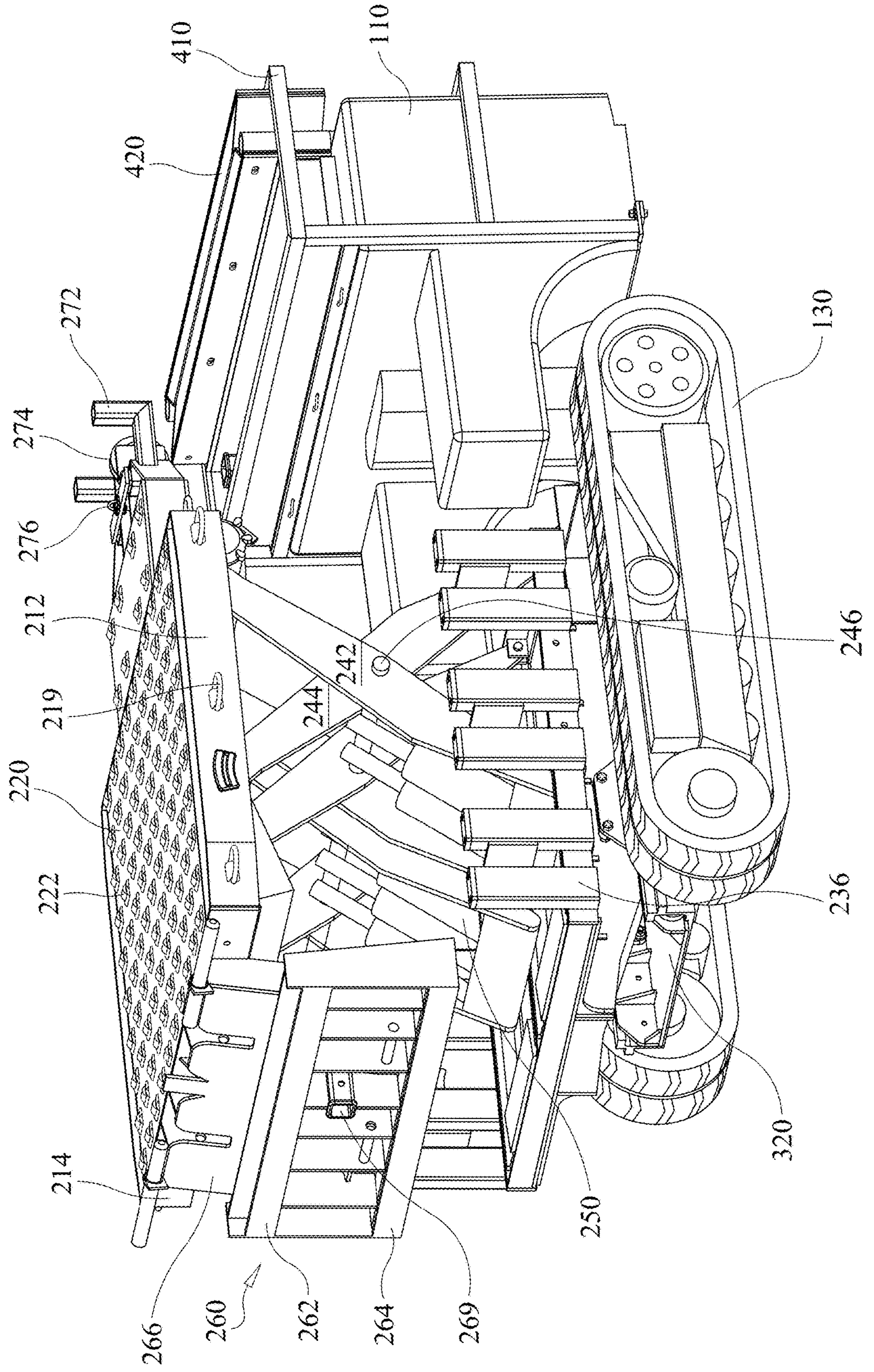
FIG. 3 is a second front perspective view of the exemplary embodiment of the cargo loader showing a deck platform in an extended position.
Figure 4:
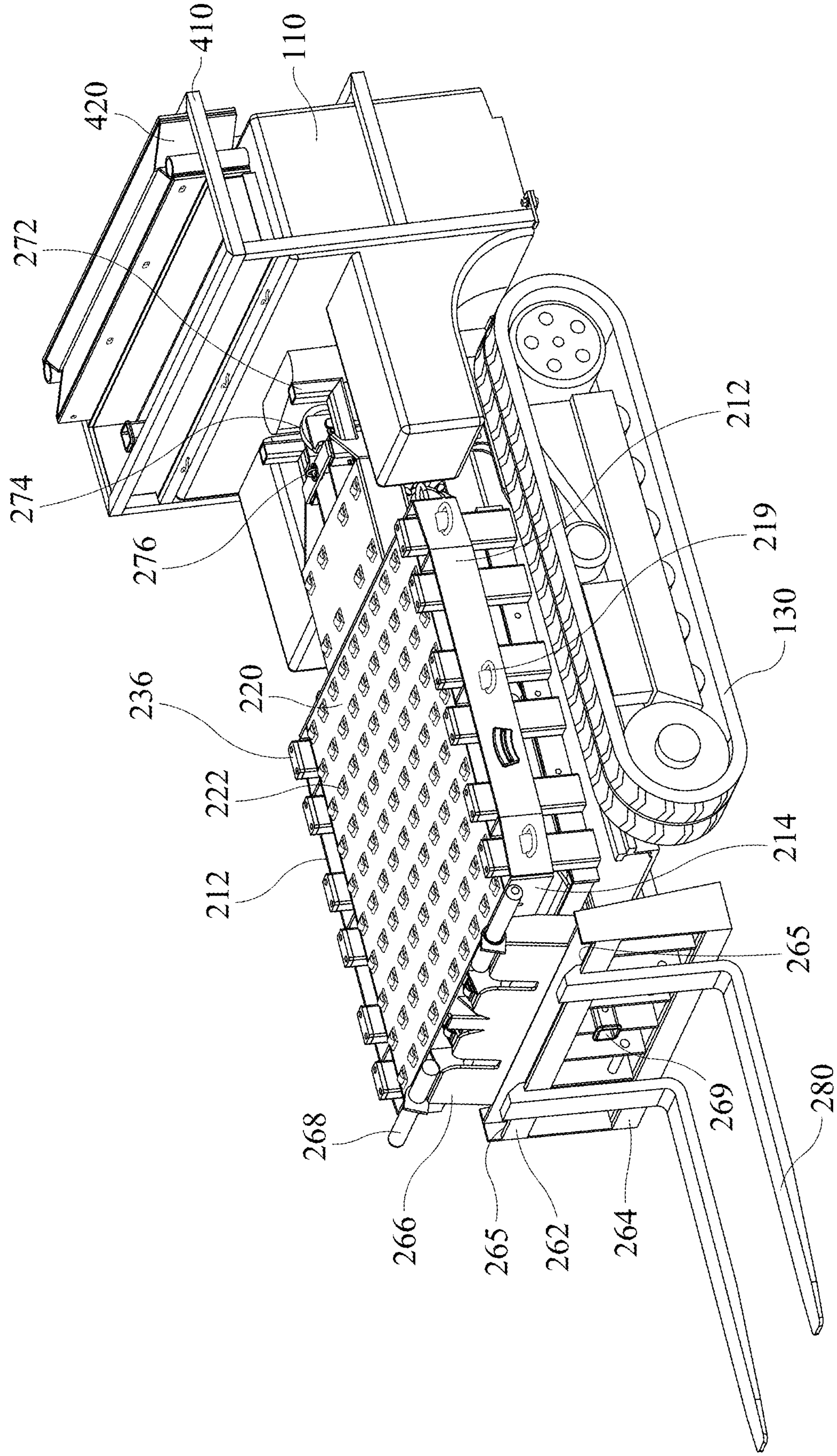
FIG. 4 is a third front perspective view of the exemplary embodiment of the cargo loader with a first fork extension showing a deck platform in a retracted position.

Referring to FIG. 1 to 2 initially, the exemplary embodiment of the cargo loader 10, comprises a tractor assembly 100, a vertical adjustment assembly 200, a ramp assembly 400, and a detachable and interchangeable fork riser assembly 500 which is shown being replaced by a first fork extension 280 in FIG. 2 and detached to the cargo loader 10 in FIGS. 3 and 4. The vertical adjustment assembly 200 is carried by the tractor assembly 100, and further comprises a tilting assembly 300 configured to incline the deck platform between a predetermined forward tilted angle or a predetermined backward tilted angle. Preferably, the ramp assembly 400 is coupled to a rear end of the engine compartment 110.

With continued reference to FIG. 2, in order to support moving parts and movement of the cargo loader 10, the tractor assembly 100 further comprises an engine compartment 110, a lower plate 120, and continuous tracks 130, which are operably coupled to each other. The engine compartment 110 provides mechanical energy to the cargo loader 10 and is preferably mechanically coupled to a hydraulic system to provide heavy-duty power and control to the moving parts of the cargo loader 10, including the continuous tracks 130, the vertical adjustment assembly 200, the tilting assembly 300, and the fork riser assembly 500. The continuous tracks 130 are suitable for unimproved grounds or challenging surfaces. The lower plate 120 further comprises two hinge leaves 122 and two guide rails 124 configured to couple to the tilting assembly 300. It is anticipated that the tractor assembly 100 may vary in configuration, such as wheels, to facilitate movement of the cargo loader 10 without departing from the spirit of the invention. In addition, the cargo loader 10 may be controlled by a remote control or a hard wire control panel.

Figure 5:
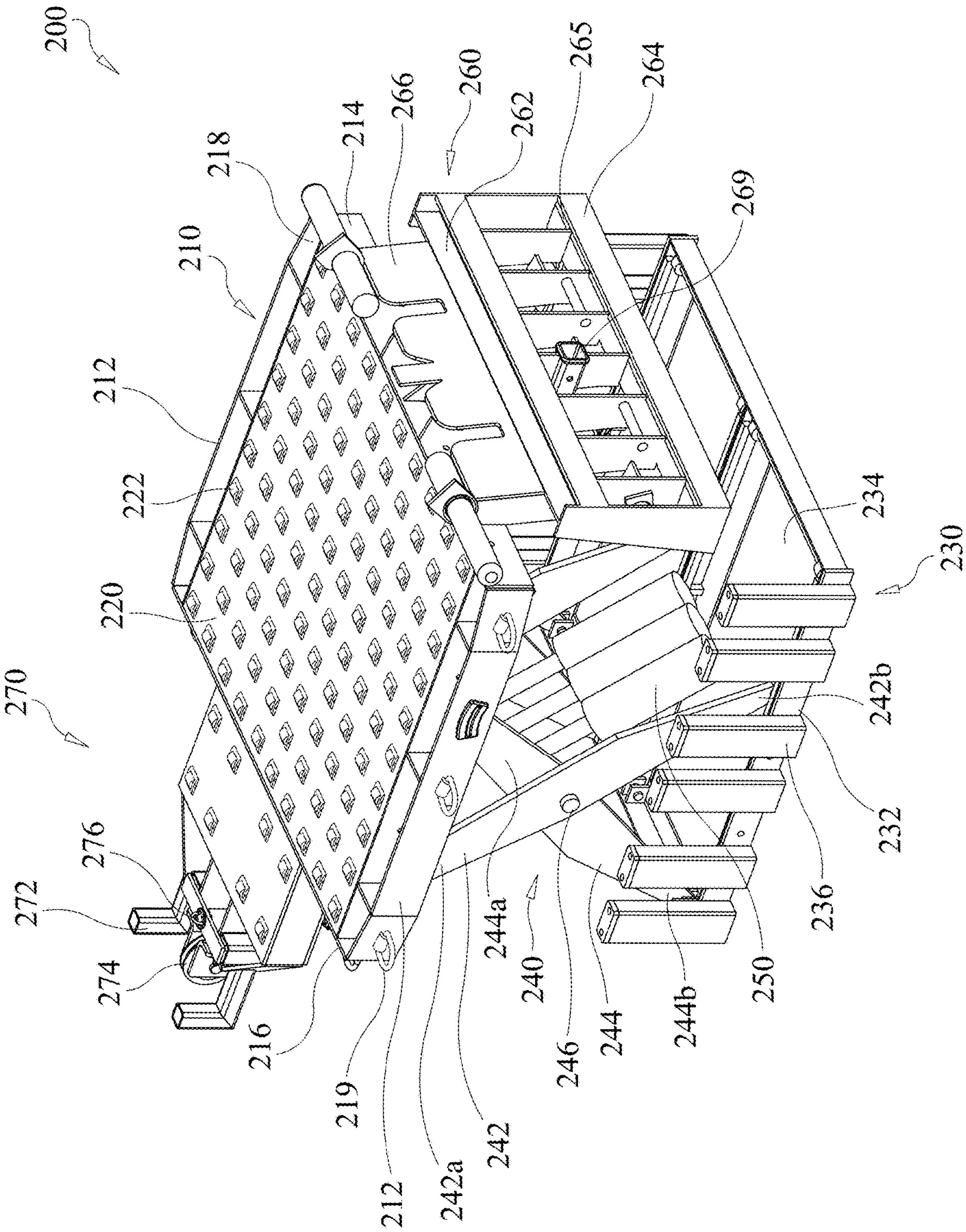
FIG. 5 is a right perspective view of a vertical lifting assembly of the exemplary embodiment of the cargo loader in the extended position.
Figure 6:
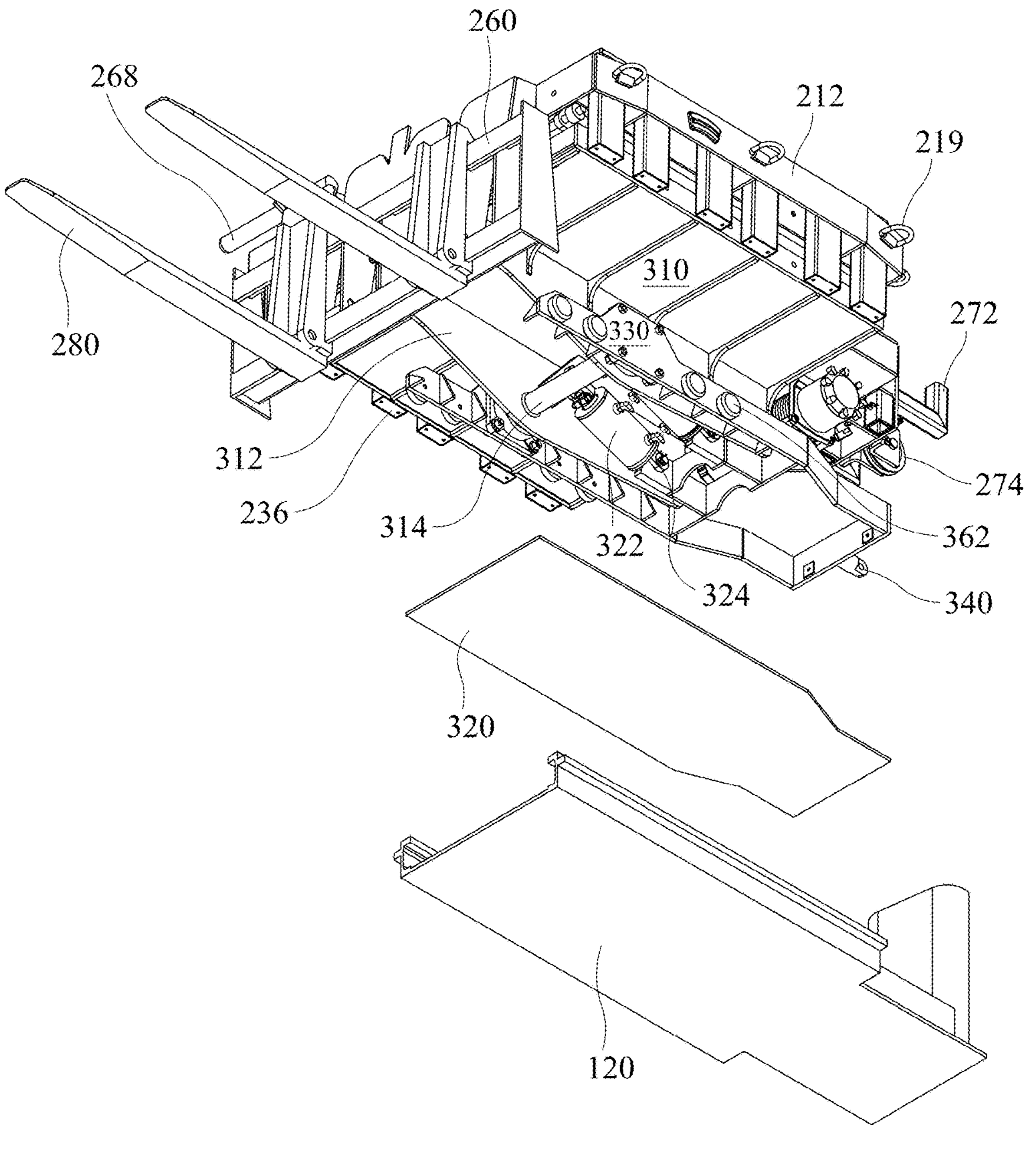
FIG. 6 is a partially exploded view of the exemplary embodiment of the cargo loader with a titling assembly.

Turning now to the vertical adjustment assembly 200, as shown in FIG. 5, the vertical adjustment assembly 200 is configured to be carried by the tractor assembly 100, and further comprises a longitudinal base 230, a longitudinal deck platform 220 disposed above the base 230, and an adjustable lifting mechanism 240 mounted between the base 230 and the deck platform 220. The base 230 and the deck platform 220, respectively, has a top surface, a bottom surface, a front surface, a rear surface, and two side surfaces. Preferably, the lifting mechanism 240 comprises a scissor lift with at least two spaced apart scissor link sets 240, pivotally coupled to two ends of a central brace 246. Each of the scissor link sets 240 further comprises an exterior arm 242 and an interior arm 244, each of which has an upper end 242*a*, 244*a* and a lower end 242*b*, 244*b*. Each exterior arm 242 is rotatably mounted at a center of the interior arm 244 and pivots about the central brace 246. The upper ends 242*a*, 244*a* of the scissor link sets 240 are operably and mechanically coupled to the bottom surface of the deck platform 220, and the lower ends 242*b*, 244*b* of the scissor link sets 240 are operably and mechanically coupled to the top surface of the base 230. Furthermore, the scissor link sets 240 are mechanically coupled to a plurality of first hydraulic cylinders 250 which is connected to the hydraulic system. Consequently, the scissor link sets 240 are configured to retract and extend in a vertical direction such that a height of the deck platform 220 may be adjusted to a desired height and vary between a retracted height (FIG. 1) and an extended height (FIG. 3).

The base 230 may further comprise a base plate 234, and a base frame 232 along a periphery of the base plate 234. A plurality of stanchions 236 extend vertically from the base frame 232, and a height of each of the stanchions 236 is greater than the retracted height and less than the extended height of the deck platform 220. In the exemplary embodiment, the stanchions 236 on two sides of the base 230 has a rectangular prism configuration, equal in number and arranged symmetrically, such that weight of the palletized cargo 610 can be evenly distributed. However, it is anticipated that the number, arrangement and shape of the stanchions 236 may vary without departing the spirit of the invention. In addition, a plurality of rollers 222 is disposed on the deck platform 220, enabling the palletized cargo 610 on the deck platform 220 to be moved effortlessly.

The vertical adjustment assembly 200 may further comprise a head frame 210 along a periphery of the deck platform 220. The head frame 210 is comprised of two head side members 212, a head front member 214, and a head rear member 216. Each of head side members 212 further comprises one or more receptacles 218 configured to receive and provide passage for the stanchions 236 to protrude through the head frame 210, as shown in FIG. 4. Further, a plurality of rings 219 configured to receive a securement strap may be added to each of the head side members 212 to provide further securement of the palletized cargo 610 on the deck platform 220.

Figure 12:
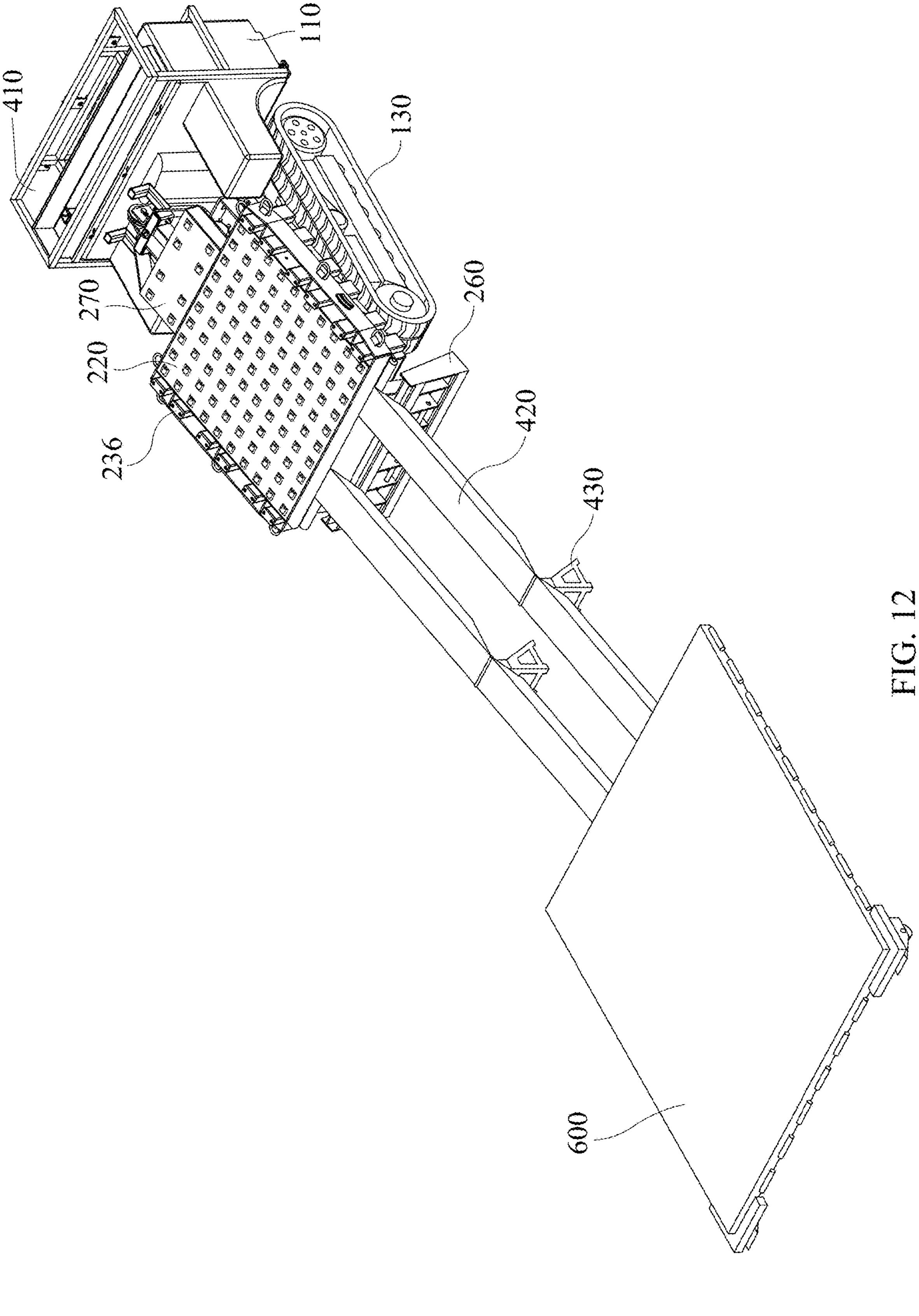
FIG. 12 schematically depicts the ramp set being attached to the cargo loader.
Figure 14:
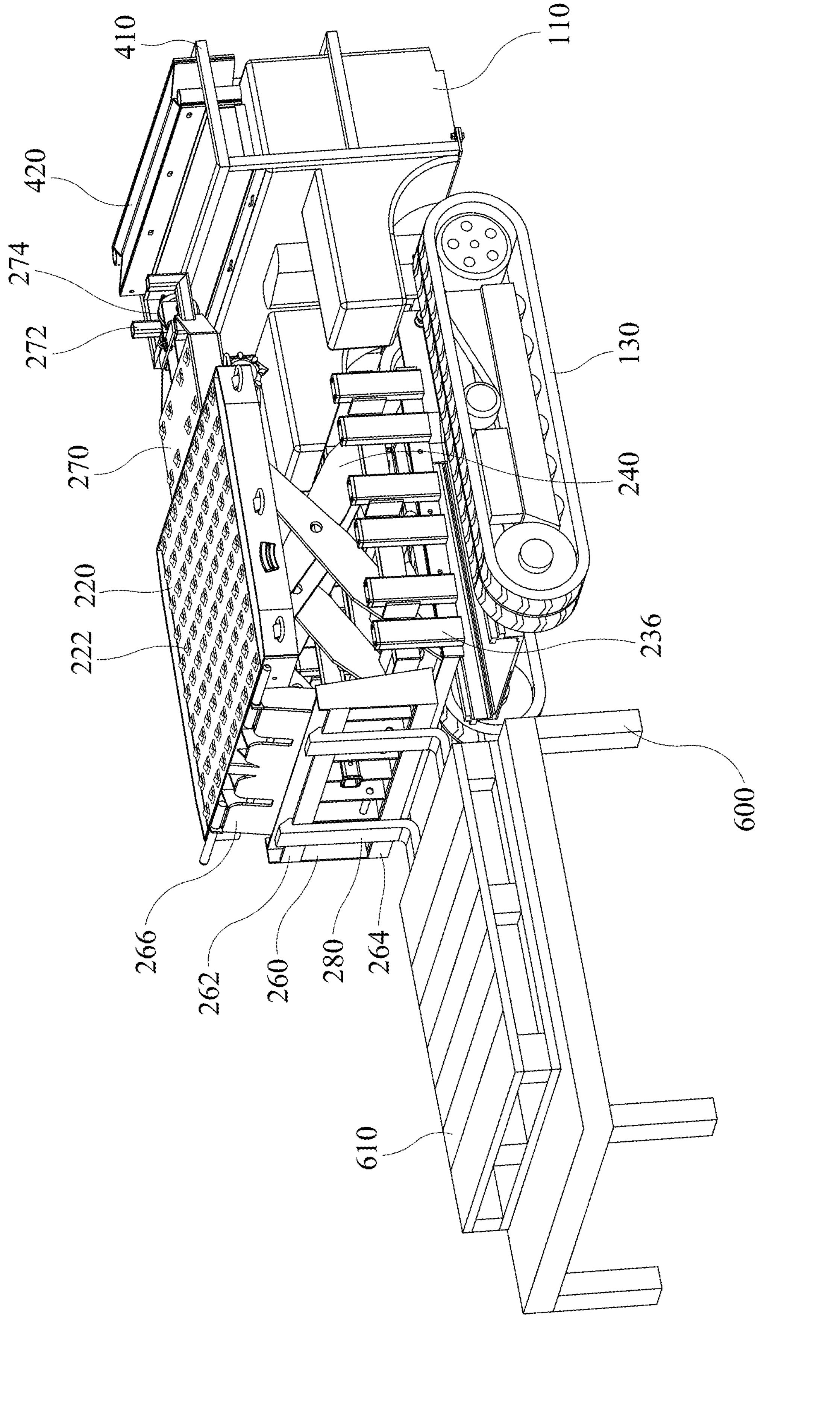
FIG. 14 schematically depicts the cargo loader with the fork extension repositioning the pallet from a platform.
Figure 15:
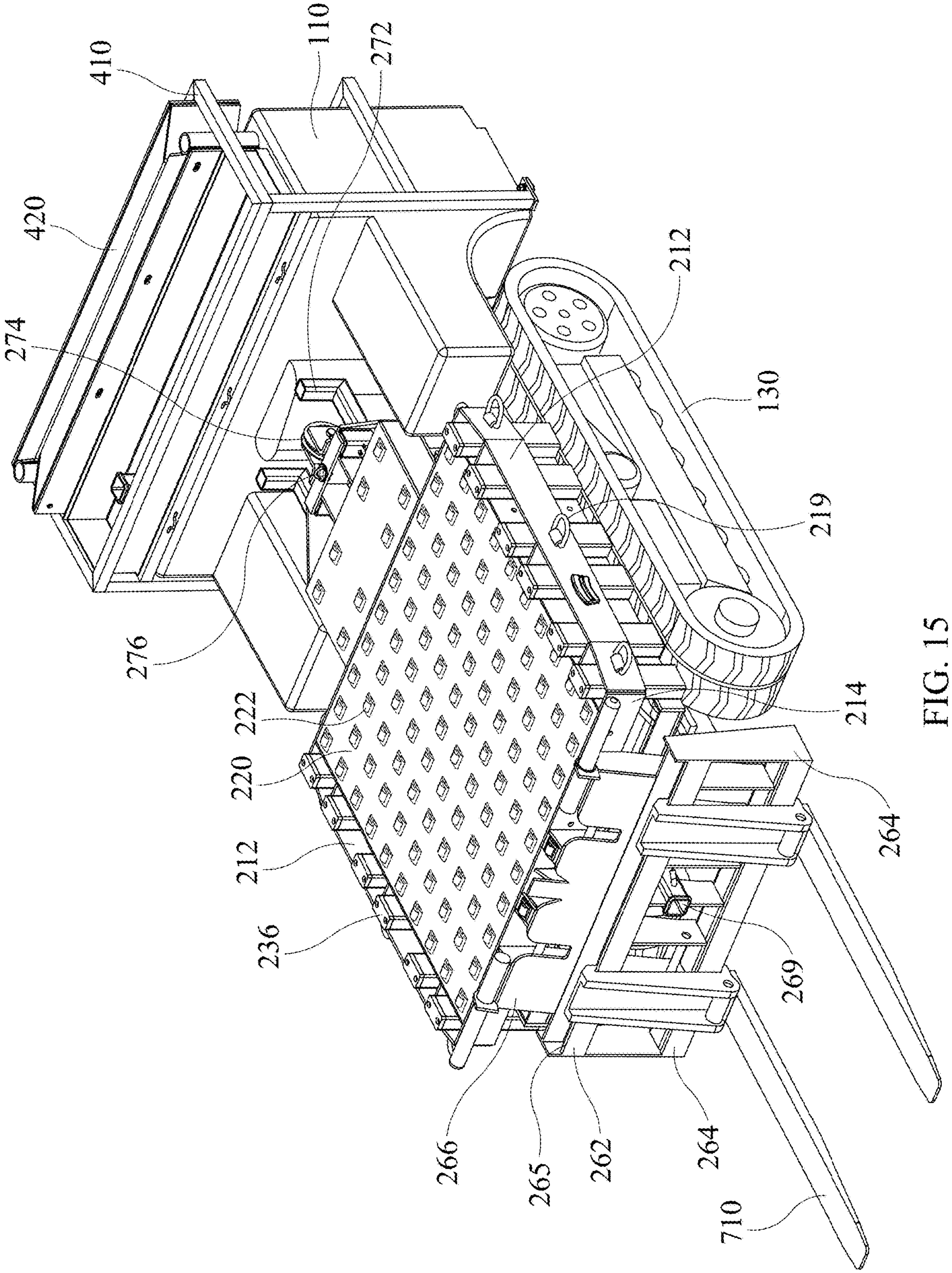
FIG. 15 is a perspective of the exemplary embodiment of the cargo loader with third fork extensions.
Figure 16:
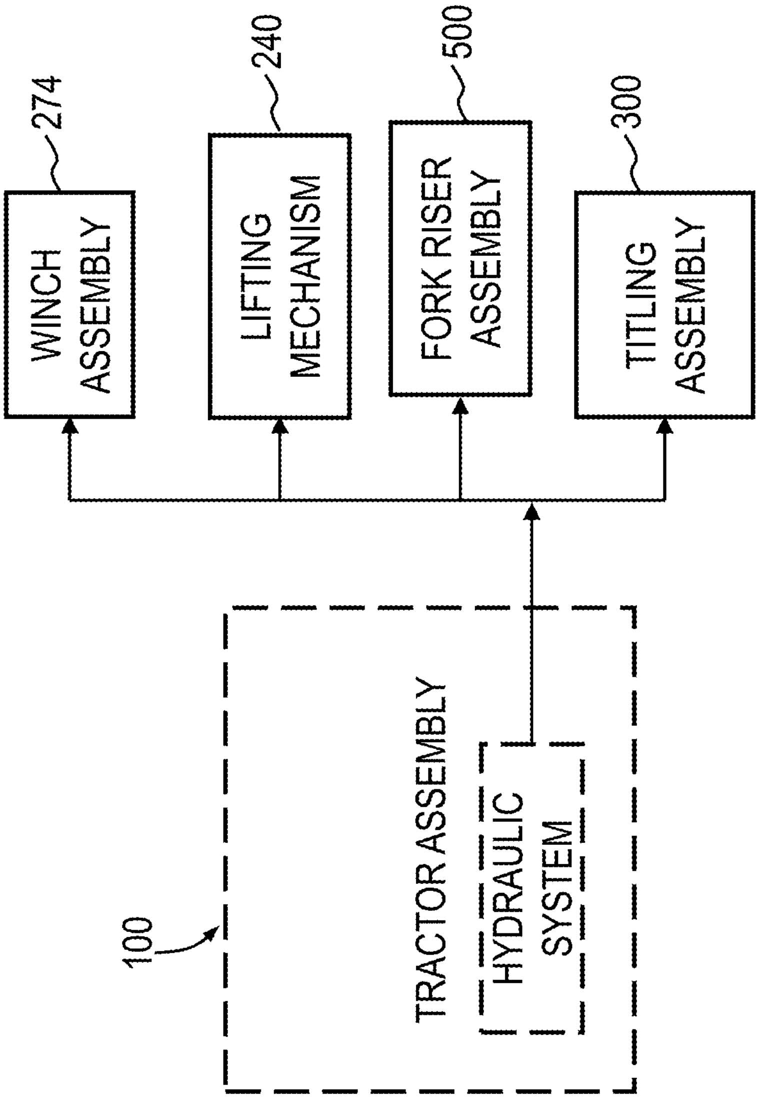
FIG. 16 is a block diagram of the exemplary embodiment of the cargo loader.

With continued reference to FIG. 5, a mounting bracket 260 mounted on the head front member 214 is configured to couple to a plurality of interchangeable and removable attachments, including the fork riser assembly 500 shown in FIG. 1, a first fork extension 280 shown in FIG. 4, a ramp set 420 as shown in FIG. 12, and a third fork extension shown in FIG. 15. The mounting bracket 260 further comprises a top bar 262 and a bottom bar 264, each of which having a locking groove 265 and spaced apart from each other. A top extension 266 extends upwards from the top bar 262, and further comprises two ramp connecting rods 268 configured to couple to the ramp set 420. Additionally, the mounting bracket 260 may further comprise a hitch receiver 269 as a coupling mechanism for further attachments to trailers, implements or machinery. As shown in FIG. 14, load-bearing may be turned to the first fork extension 280 instead of the deck platform 220, and the first fork extension 280 may be elevated or retracted with the deck platform 220.

Moreover, the deck platform 220 comprises a tail stock set 270 disposed on the head rear member 216 and further comprises a pallet stop 272 on a rear end and a winch assembly 274, and a fairlead set 276 to facilitate self-loading of the palletized cargo 610. The pallet stop 272 holds the palletized cargo 610 when the vertical adjustment mechanism 200 inclines backwards, thereby preventing the palletized cargo 610 from sliding along the tilted angle.

Figure 7:
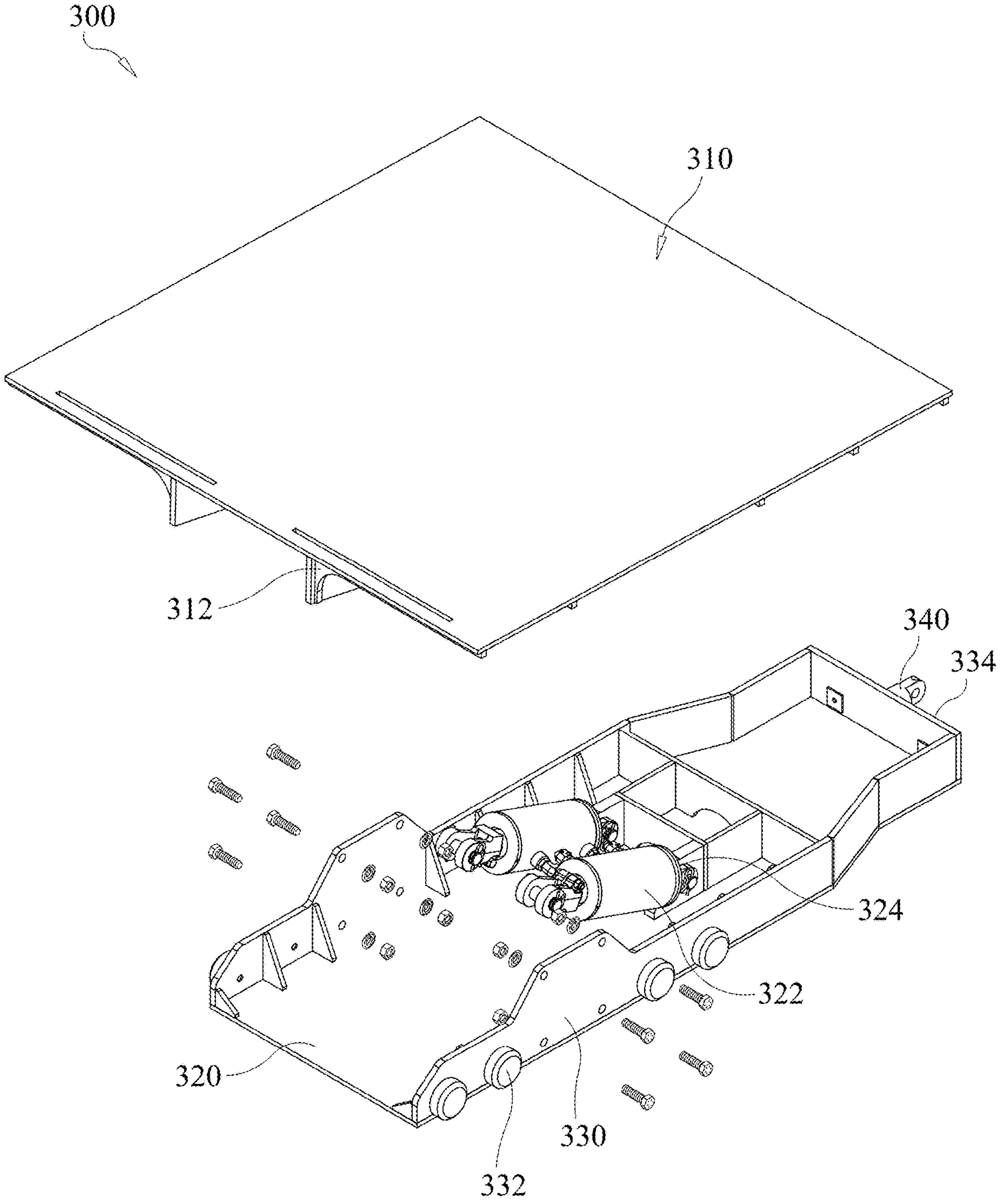
FIG. 7 is an exploded view of the tilting assembly.
Figure 8:
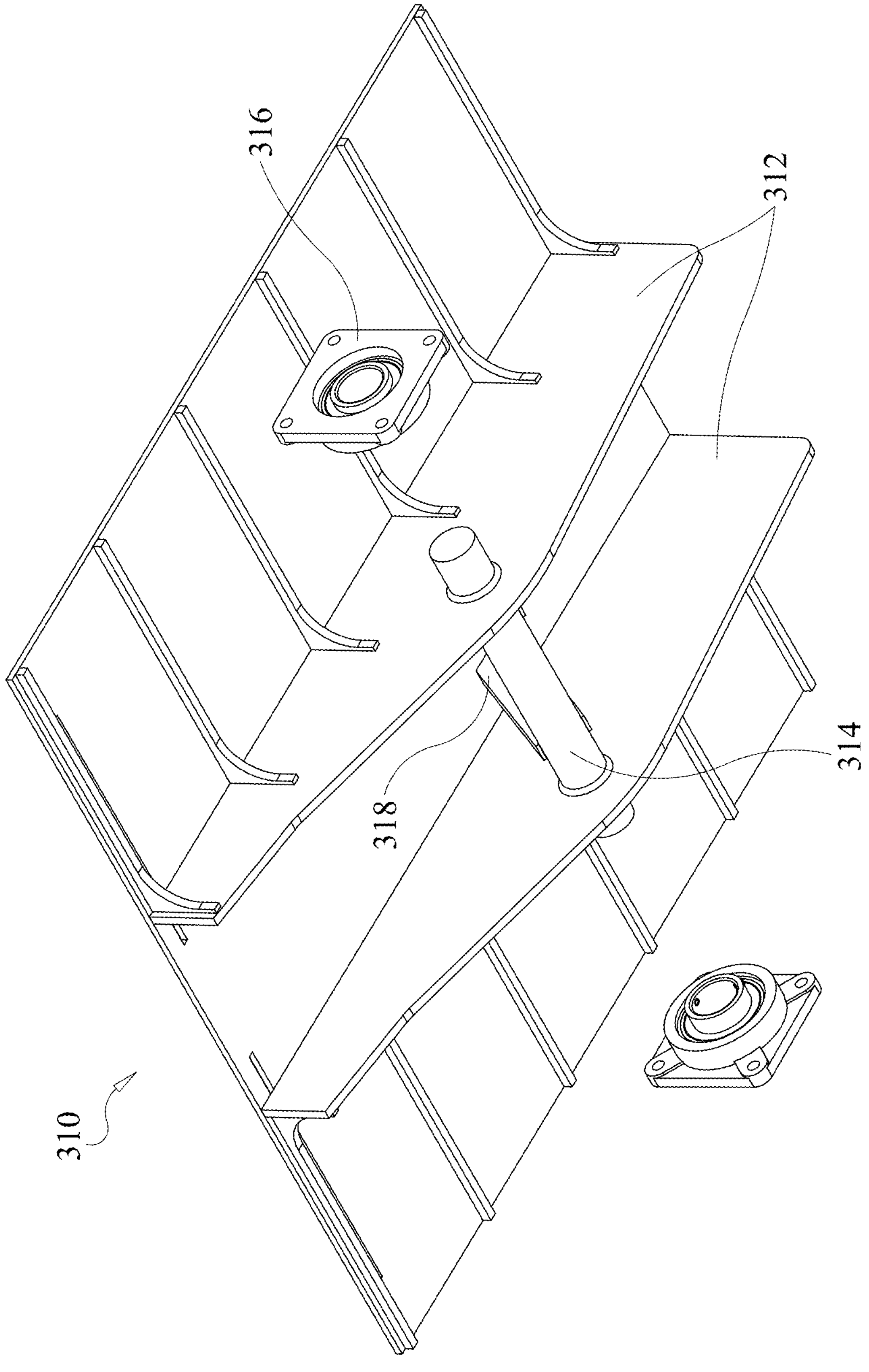
FIG. 8 is a partially exploded view of a top plate of the tilting assembly.
Figure 9:
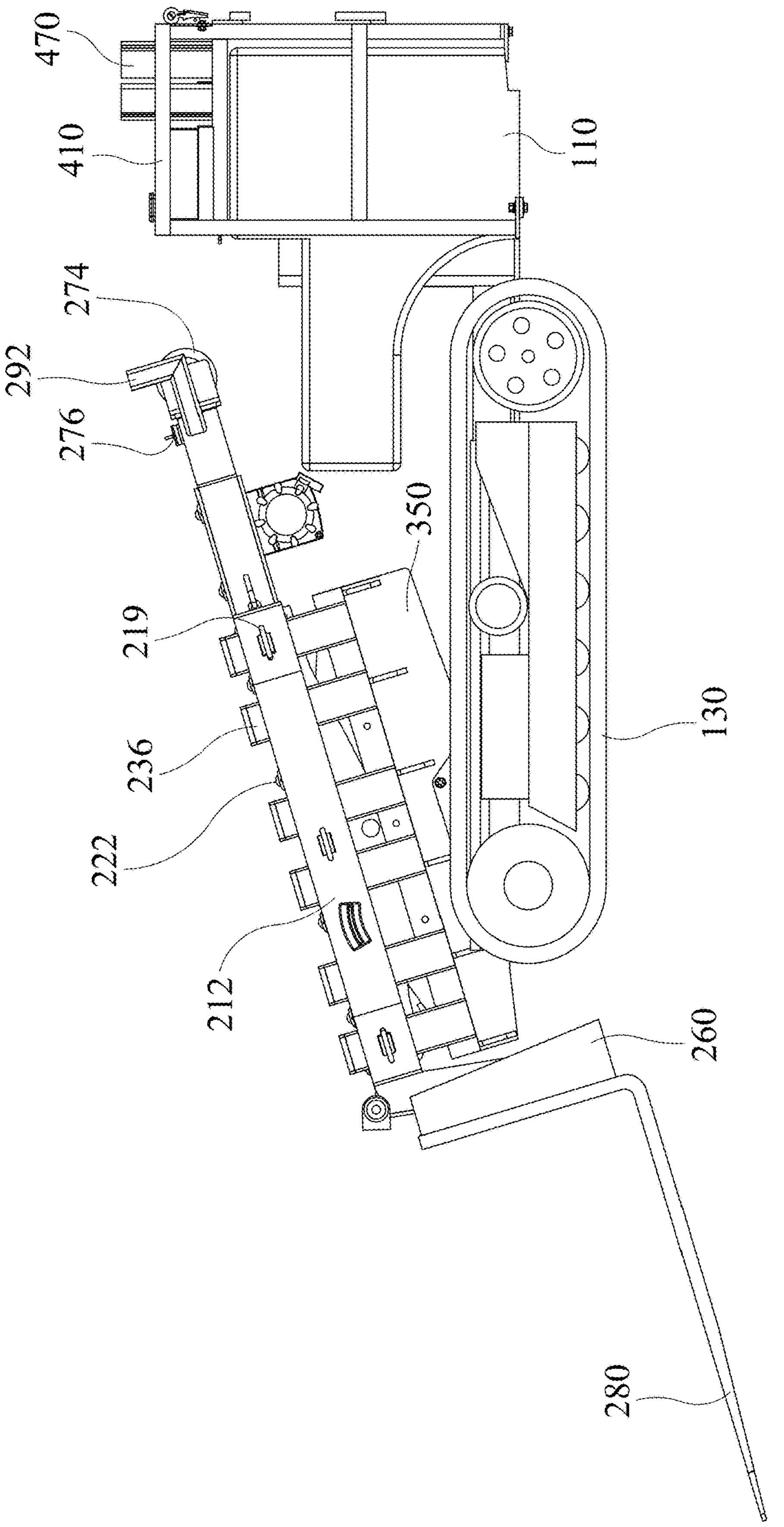
FIG. 9 is a side view of the cargo loader inclining forward.

Turning to FIGS. 6 to 9 and in conjunction with FIG. 2, the tilting assembly 300 comprises a top plate 310 having a top side and a bottom side, a bottom plate 320, and two second hydraulic cylinders 322 mechanically coupled to the top plate 310 on a first end at a top cylinder mount 318 (FIG. 8) and to the bottom plate 320 on a second end at a bottom cylinder mount 324 (FIG. 7). The top side of the top plate 310 is attached to the bottom surface of the base 230 of the vertical adjustment assembly 200, such that the deck platform 220 of the vertical adjustment assembly 200 is urged to tilt forward and backward, as shown in FIG. 9. The bottom side of the top plate 310 further comprises two spaced apart longitudinal supporting members 312 disposed perpendicularly to the bottom side and at a middle portion of the top plate 310. A crossbar 314 is mounted near a center in-between the two supporting members 312 and secured to the two supporting members 312 by two flange bearings 316. Each of the supporting members 312 has a substantially slope configuration with two oblique sides adjacent to the bottom plate 320 and pivotally attached to the bottom plate 320, such that the top plate 310 may incline to a preferably tilted angle of 15 degrees forward or tilted angle of 5 degrees backward. The base plate 320 further comprises a rear plate 334 and two side plates 330 extending upwards from the base plate 320. A hinge tab 340 is added to the rear plate 334, and a plurality of wheels 332 are rotatably attached to the two side plates 330, such that the wheels 332 may slide into the glide rail 124 of the tractor assembly 100 (FIG. 2) and the hinge tab 340 is further coupled with the hinge leaves 122 on the lower plate 120 of the tractor assembly 100.

Figure 10:
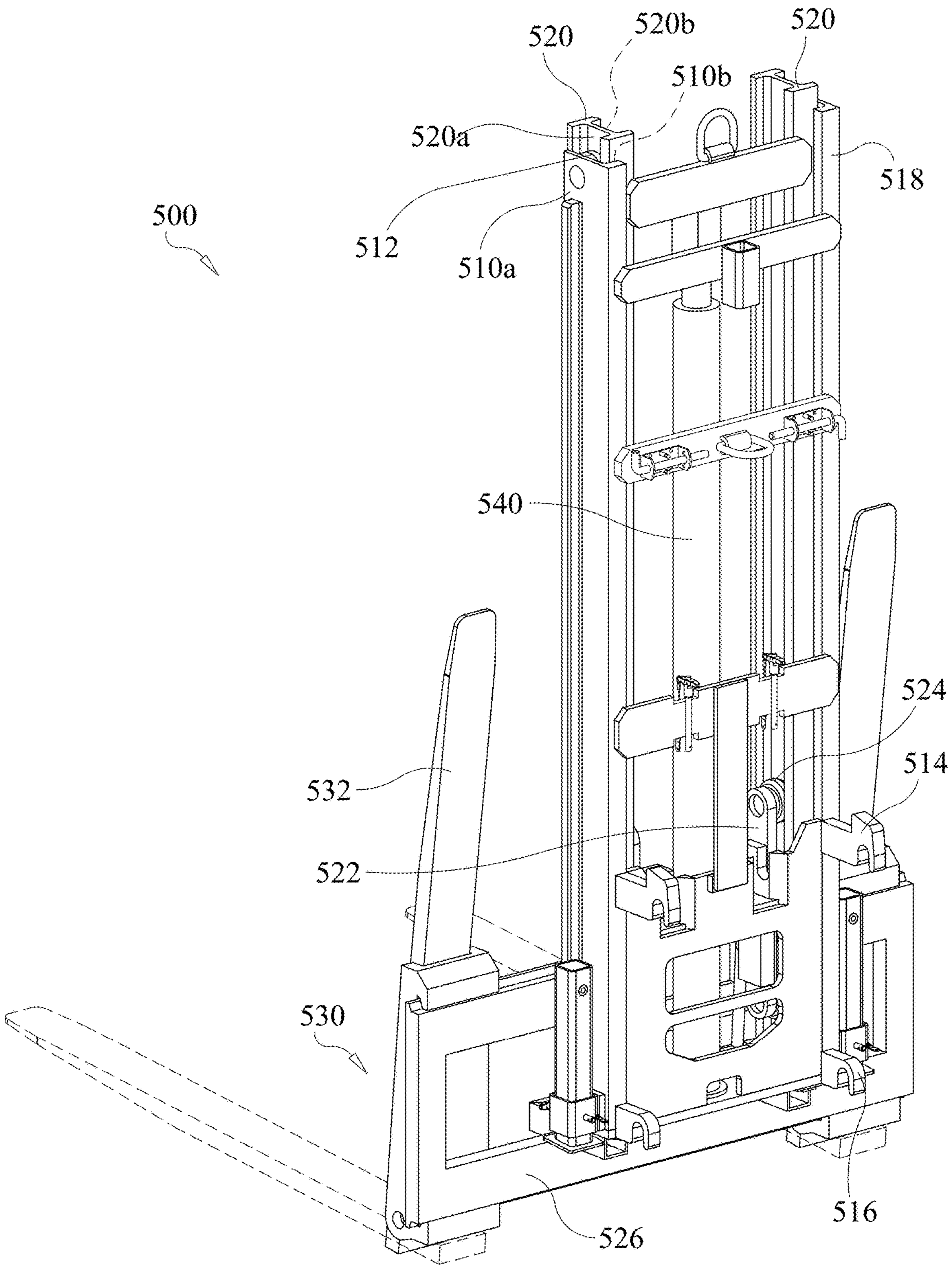
FIG. 10 is a rear perspective view of the fork riser with rotatable second fork extensions.

Referring now to FIG. 10 and in conjunction with FIG. 2, the fork riser assembly 500 comprises two vertical frames 510, two vertical guide tracks 520 each of which movably coupled to each of the two vertical frames 510 respectively, a fork set 530 movably coupled to the two vertical guide tracks 520, and a third hydraulic cylinder 540. Each of the two vertical frames 510 and each of two vertical guide tracks 520, respectively, has an outer side surface 510*a*, 520*a* and an inner side surface 510*b*, 520*b*. A set of first rollers 512 is rotatably attached to the inner side surface 510*b* of each of the vertical frames 510. The inner side surface 520*b* of each of the guide tracks 520 further comprises a guide plate 522 and a set of second rollers 524 rotatably coupled to the guide plate 522, such that the guide plate 522 may slide along the guide track 520. The fork set 530 is further coupled to the guide plate 522 by a front brace 526. The third hydraulic cylinder 540 is connected to the hydraulic system and mechanically coupled to the two guide tracks 520 and the fork set 530. Therefore, the two guide tracks 520 may ascend or descend relative to the vertical frame 510, and the fork set 530 may ascend or descend relative to the two guide tracks 520. To attach the fork assembly 500 to the mounting bracket 260 of the vertical adjustment assembly 200, each of the two vertical frames 510 further comprises an upper connector 514 and a lower connector 516. The upper connector 514 interlocks with the locking groove 265 of the top bar 262, and the lower connector 516 interlocks with the locking groove 265 of the bottom bar 264. As can be seen in FIG. 10, the fork set 530 comprises rotatable second fork extensions 532 that pivots to be parallel or perpendicular to the two vertical frames 510.

Figure 11:
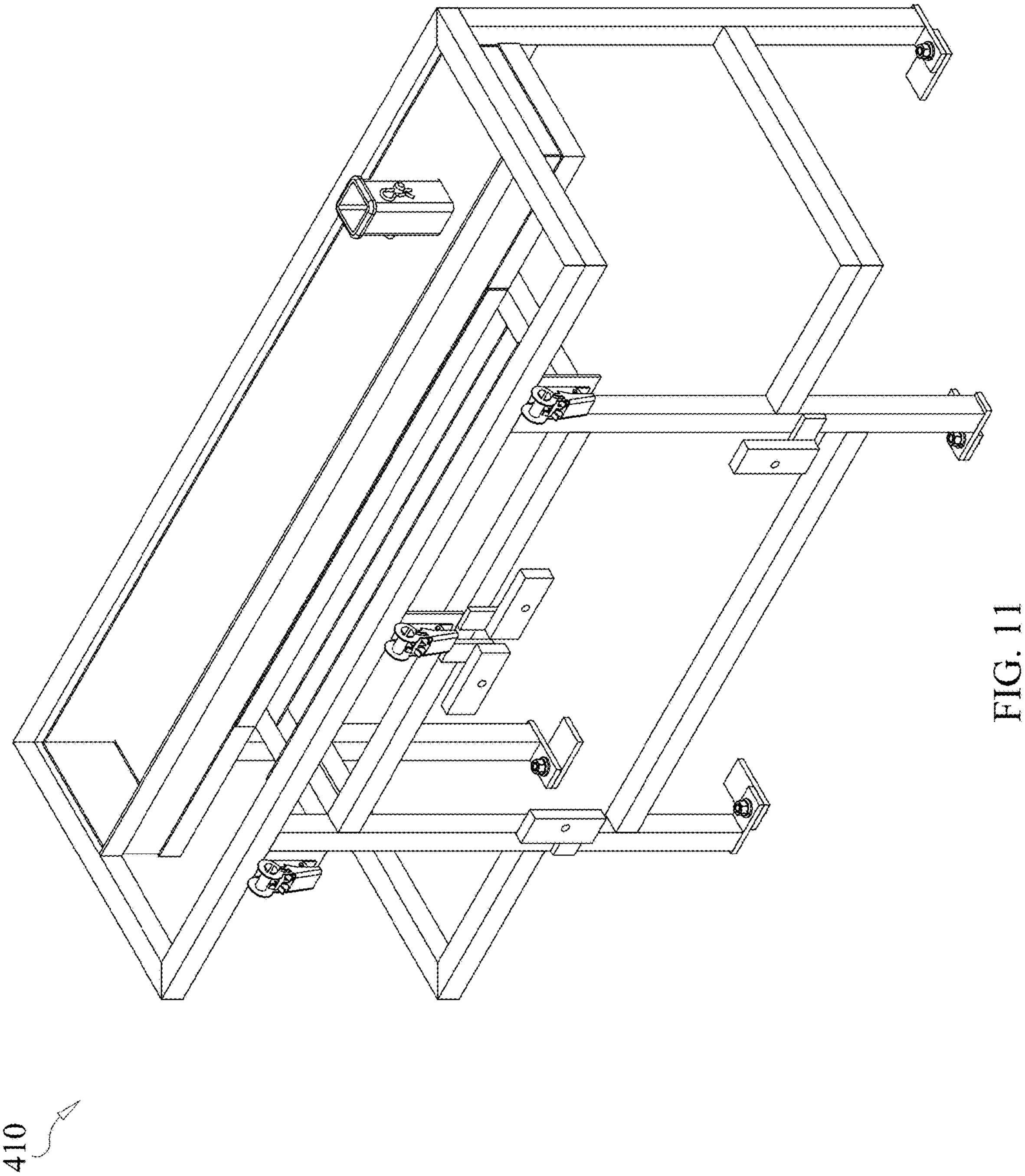
FIG. 11 is a perspective view of a rack for stowing the ramp set.

Next with reference to FIGS. 11 to 12 and in conjunction with FIG. 2, as aforementioned, the ramp assembly 400 is coupled to a rear end of the engine compartment 110. The ramp assembly 400 further comprises a ramp rack 410 storing a foldable ramp set 420. The ramp set 420 may be folded when stored and may be unfolded to couple to the vertical adjustment assembly 200 when tilted forward. The ramp set 420 is coupled to the mounting bracket 260 by the ramp connecting rods 268. In addition, the ramp set 420 may comprise supports 430 to uphold the ramp set 420. Advantageously, a user may utilize the ramp set 420 alongside with the assembly 274 and the fairlead set 276 to facilitate self-loading of a pallet 600.

An exemplary method of using the cargo loader 10 is presented herein to further demonstrate the convenience and securement of the cargo loader 10. It is anticipated that several steps may be sequentially interchangeable and equivalent application of one or more permutations of such sequentially interchangeable steps does not alter the spirit of the invention in any meaningful way.

Figure 13:
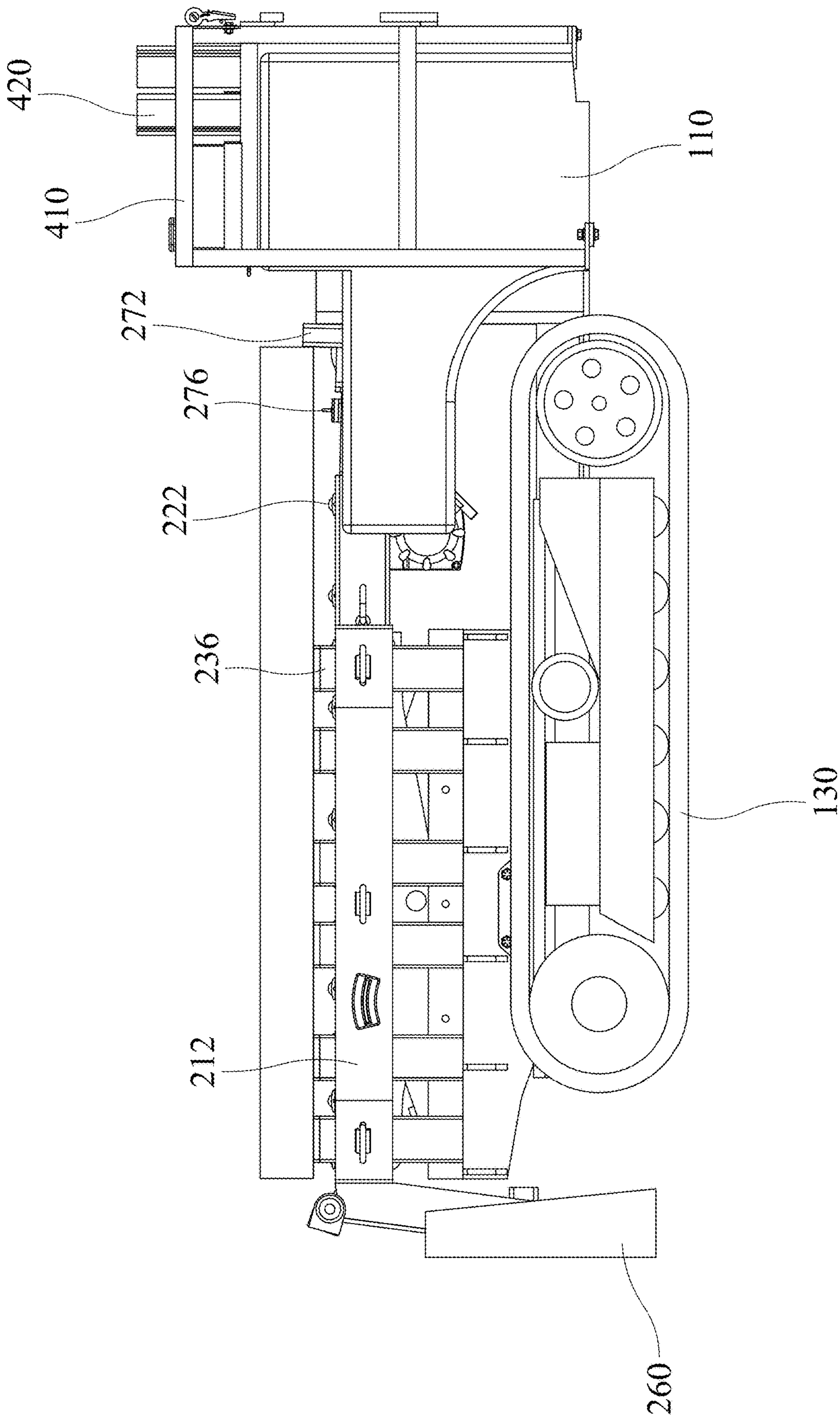
FIG. 13 is a side view of the pallet being placed on the deck platform and lifted by a plurality of stanchions.

First, to upload a palletized cargo 610 to the deck platform 220, by operating the remote control or the hard wire control panel, an exemplary user extends the vertical adjustment assembly 200 to a height greater than or equal to the stanchions 236, for example, shown in FIG. 3, such that the palletized cargo 610 may be in contact with the rollers 222, thereby allowing the palletized cargo 610 to be positioned effortlessly on the deck platform 220. Upon completion of uploading the palletized cargo 610, the exemplary user then retracts the vertical adjustment assembly 200 to a height less than the stanchions 236, for example, shown in FIG. 13, such that the palletized cargo 610 departs away from the rollers 222 and is lifted by the stanchions 236. Next, the exemplary user may direct the cargo loader 10 to move to a desired location. With the palletized cargo 610 not contacting the rollers 222, the palletized cargo 610 has a lower risk of gliding or slipping off the deck platform 220 during the movement of the cargo loader 10. Arriving at the destination, the exemplary user extends the vertical adjustment assembly 200 to the height greater than or equal to the stanchions 236, such that the rollers 222 may facilitate off-loading the palletized cargo 610. The exemplary user may also utilize the aforementioned ramp set 420 for heavier pallets to assist with the uploading and off-loading of the palletized cargo 610.

For repositioning the palletized cargo 610 from a platform 600, the exemplary user may add the fork riser 500 or the first and third fork extensions 280, 710, shown in FIGS. 2, 14 and 15. The first and third fork extensions 280, 710 may ascend or descend by retracting and extending the vertical adjustment assembly 200.

Advantageously, the stanchions 236 together with vertical movements of the vertical adjustment assembly 200 provides a more secured way of transporting palletized cargo 610 or other supplies. The removable and interchangeable attachments provide versatility to the cargo loader 10. Moreover, the cargo loader 10 may easily fit inside aircrafts such as, MV-22, CH-53E, CH-47, C-130 or C-17 or the like.

While the embodiments of the invention have been disclosed, certain modifications may be made by those skilled in the art to modify the invention without departing from the spirit of the invention.

What is claimed is:

1. A vertical adjustment assembly configured to be carried by an associated tractor assembly, the vertical adjustment assembly comprising:

a base;

a deck platform comprising a winch assembly;

a lifting mechanism configured to mechanically couple the deck platform to the base and configured to retract and extend in a vertical direction such that a height of the deck platform varies between a predetermined retracted height and a predetermined extended height; and at least one fork extension removably coupled to the deck platform.

2. The vertical adjustment assembly as described in claim 1, wherein the lifting mechanism comprises a scissor lift.

3. The vertical adjustment assembly as described in claim 1, wherein the deck platform comprises a plurality of rings positioned along a perimeter thereof.

4. The vertical adjustment assembly as described in claim 1, wherein the winch assembly is connected to a side of the deck platform and is configured to move with the deck platform.

5. The vertical adjustment assembly as described in claim 1, wherein the winch assembly is coupled to a hydraulic system.

6. The vertical adjustment assembly as described in claim 1, wherein the deck platform comprises a plurality of rollers.

7. The vertical adjustment assembly as described in claim 1, wherein the vertical adjustment assembly further comprises a tilting assembly configured to mechanically couple to the base and configured to incline the vertical adjustment assembly between a forward tilted angle or a backward tilted angle.

8. A cargo loader, comprising:

a tractor assembly; and a vertical adjustment assembly configured to be carried by the tractor assembly, the vertical adjustment assembly comprising:

a base;

a deck platform comprising a winch assembly;

a lifting mechanism configured to mechanically couple the deck platform to the base and configured to retract and extend in a vertical direction such that a height of the deck platform varies between a predetermined retracted height and a predetermined extended height;

and at least one fork extension removably coupled to the deck platform.

9. The cargo loader as described in claim 8, wherein the lifting mechanism is mechanically coupled to a hydraulic system.

10. The cargo loader as described in claim 8, wherein the tractor assembly comprises continuous tracks.

11. The cargo loader as described in claim 8, wherein the vertical adjustment assembly further comprises a tilting assembly configured to mechanically couple to the base and configured to incline the vertical adjustment assembly between a forward tilted angle or a backward tilted angle.

12. A cargo loader, comprising:

a tractor assembly;

a vertical adjustment assembly configured to be carried by the tractor assembly, the vertical adjustment assembly comprising:

a base;

a deck platform;

a lifting mechanism configured to mechanically couple the deck platform to the base and configured to retract and extend in a vertical direction such that a height of the deck platform varies between a predetermined retracted height and a predetermined extended height;

a winch assembly connected to a side of the deck platform of the deck platform; and at least one fork extension removably coupled to the deck platform.

13. The cargo loader as described in claim 12, wherein the lifting mechanism comprises a scissor lift.

14. The cargo loader as described in claim 12, wherein the deck platform comprises a plurality of rings positioned along a perimeter thereof.

15. The cargo loader as described in claim 12, wherein the lifting mechanism is mechanically coupled to a hydraulic system.

16. The cargo loader as described in claim 12, wherein the tractor assembly comprises continuous tracks.

17. The cargo loader as described in claim 12, wherein the tractor assembly is connected to the hydraulic system.

18. The cargo loader as described in claim 12, wherein the winch assembly is connected to the hydraulic system.

19. The cargo loader as described in claim 12, wherein the deck platform comprises a plurality of rollers.

20. The cargo loader as described in claim 12, wherein the vertical adjustment assembly further comprises a tilting assembly configured to mechanically couple to the base and configured to incline the vertical adjustment assembly between a forward tilted angle or a backward tilted angle.

* * * * *